(12) United States Patent
Taggart

(10) Patent No.: US 6,607,626 B2
(45) Date of Patent: Aug. 19, 2003

(54) PROCESS AND EQUIPMENT FOR MANUFACTURE OF ADVANCED COMPOSITE STRUCTURES

(75) Inventor: David Taggart, San Carlos, CA (US)

(73) Assignee: Hypercar Inc., Basalt, CO (US)

( * ) Notice: Subject to any disclaimer, the term of this patent is extended or adjusted under 35 U.S.C. 154(b) by 0 days.

(21) Appl. No.: 09/916,254

(22) Filed: Jul. 30, 2001

(65) Prior Publication Data
US 2002/0059976 A1 May 23, 2002

Related U.S. Application Data
(60) Provisional application No. 60/221,517, filed on Jul. 28, 2000.

(51) Int. Cl.[7] ............................ B32B 5/12; B32B 31/20; D04H 3/00
(52) U.S. Cl. ................. 156/177; 156/178; 156/180; 156/181
(58) Field of Search ............................ 156/177, 178, 156/180, 181

(56) References Cited

U.S. PATENT DOCUMENTS

| | | | |
|---|---|---|---|
| 3,808,040 A | 4/1974 | Barnes et al. | 117/212 |
| 4,556,440 A | 12/1985 | Krueger | 156/181 |
| 4,600,456 A | 7/1986 | Oswald | 156/117 |
| 5,269,863 A | 12/1993 | Middelman | 156/177 |
| 5,308,424 A | 5/1994 | Sasaki et al. | 156/178 |
| 5,368,913 A | * 11/1994 | Ortega | 428/198 |

FOREIGN PATENT DOCUMENTS

JP    48-2902    1/1973 ............ D04B/3/05

OTHER PUBLICATIONS

English Language Abstract of JP 48–2902 Copy of International Search Report.

* cited by examiner

Primary Examiner—Sam Chuan Yao
(74) Attorney, Agent, or Firm—Michael D. Bednarek; Shaw Pittman LLP (57) ABSTRACT

A process for continuous, tailored lamination of aligned composite materials in such a way that either pre-formed or pre-consolidated sheets are made available for subsequent infusion molding or stamping processes, the process comprising the steps of: material placement, consolidation/stabilization, cut and kit, fabrication, and final trim. A tailored blank machine is also described. The blank machine includes a series of material placement heads arranged in a linear or serial fashion along a single moving placement table, wherein each head lays down a single angle of the prescribed stacking sequence as the conveyer passes under the head at a constant speed wherein the angle is proportional to head traverse rate divided by conveyer speed.

14 Claims, 6 Drawing Sheets

PROCESS AND EQUIPMENT FOR MANUFACTURE OF ADVANCED COMPOSITE STRUCTURES

This application claim benefit to provisional No. 60/221,517, filed Jul. 28, 2000

FIELD OF THE INVENTION

The present invention addresses the affordable manufacture of advanced composite automotive structures using repeatable, monitorable, versatile, and production friendly approaches and processes.

BACKGROUND

The use of advanced composites, defined herein as highly aligned reinforcements of carbon, glass, or aramid fibers in a suitable polymer matrix of either thermoset or thermoplastic resins, is the focus of this invention. The specific intent to use aligned reinforcement is based on the following perception: The modulus of steel is 30,000,000 lbs/in$^2$, whereas the modulus of aluminum is 10,000,000 lbs/in$^2$. The modulus of a typical, higher quality glass epoxy prepreg is around 4,000,000 lbs/in$^2$. While material stiffness can be compensated to some degree via the shaping of the components to enhance structural stability, randomly reinforced composite materials currently being used by the automotive industry have even less stiffness and therefore do not offer the potential for dramatic improvements in structural performance.

For composites to be exploited in the design of an automobile, their unique characteristics must be incorporated into both the design and the production scenario of the vehicle in a way that allows their inherent advantages to be realized.

SUMMARY OF THE INVENTION

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

In another aspect, the present invention provides methods and techniques for integrating the production demands of higher volume automotive structures with the higher performance available from advanced composite materials, in a way that yields repeatable, affordable performance. The Invention provides processes for continuous, tailored lamination of aligned composite materials in such a way that either pre-formed or pre-consolidated sheets are made available for subsequent infusion molding or stamping processes respectively. The infusion processes are not unlike those already in widespread use such as resin transfer molding (RTM) or vacuum assisted resin transfer molding (VARTM). The stamping process is not unlike what is currently used to stamp steel automotive structures. For either approach, liquid infusion or solid state stamping, component design must be tailored to the processes to achieve performance and cost goals. The concept incorporates aspects of several available technologies including fiber or tape placement, stretch-broken and commingled fiber yarns, binderized preforming, heated consolidation, and NC cutting and kitting. The process that is the subject of this invention can be used with either thermoplastic or thermoset matrix resins by manipulating the various options inherent in each process step of the invention.

Advantages to this invention are that it addresses fundamental elements required if a breakthrough in affordable high performance and high volume advanced composite automotive structures are to become a reality. Issues this invention successfully address are: 1) the need for minimal touch labor between part design and near-finished part, 2) highly repeatable, tailorable, versatile, and controllable processes, 3) minimization of scrap materials during fabrication, 4) inline process monitoring and control (to minimize post-inspection and scrapped finished components), 5) delivery of "advanced composite" performance via aligned "continuous"-like fibrous reinforcement, 6) ability to handle the lay-up of many laminate architectures using the same equipment and switch between lay-ups readily to manage and balance production leveling for a range of model variants etc., and 7) in-line approach to applying other materials and value added functionality such as sound and vibration dampening, paintless coloring and finish, integral trim surfaces, among other benefits.

Accordingly, the present invention is directed to a process and equipment for manufacture of advanced composite structures.

An object of the present invention is to produce large aligned carbon reinforced components that assemble easily.

Another object of the present invention is to improve the speed and efficiency of production every year.

Another object of the present invention is to create a repeatable and consistent process in terms of quality, performance, mass, fit and function.

Another object of the present invention is to eliminate conventional painting.

Another object of the present invention is to balance capital investment with production rate and volume.

Another object of the present invention is to have a logical approach to materials handling and inventory.

Another object of the present invention is to seek a solution that minimizes scrap.

Another object of the present invention is to start with materials as close to raw material forms as possible.

Another object of the present invention is to automate as much as possible.

Another object of the present invention is to maintain a safe, clean and manageable production environment.

Another object of the present invention is to incorporate aligned carbon reinforcement.

Another object of the present invention is to control laminate architecture.

Another object of the present invention is to tailor the component design to the unique aspects of the manufacturing process being considered.

Another object of the present invention is to consider the extremes of using the same laminate, thickness, and material everywhere.

Another object of the present invention is to utilize flexibility in terms of risk, starting materials, and quality achieved.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT(S)

Reference will now be made in detail to the preferred embodiments of the present invention, examples of which are illustrated in the accompanying drawings.

Figure 1:
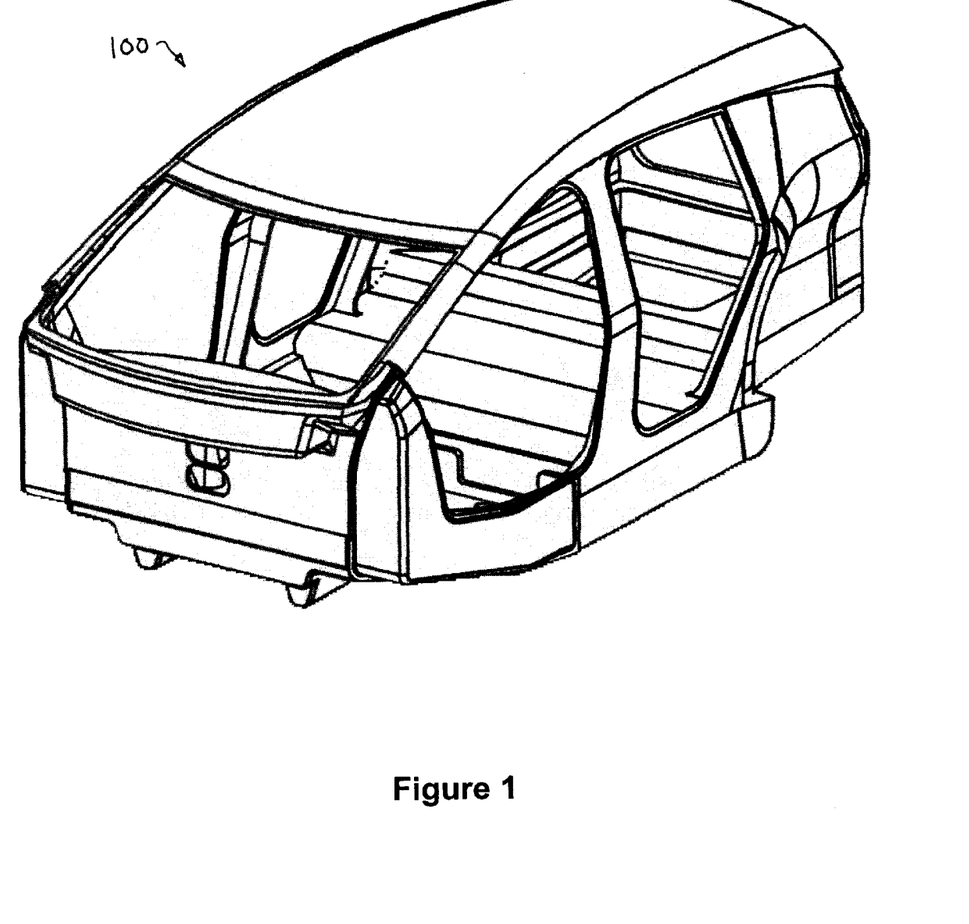
FIG. 1 is an isometric view of a preferred embodiment of a structure made in accordance with the present invention.

FIG. 1 shows an isometric view of a body structure 100 made in accordance with the present invention.

Figure 2:
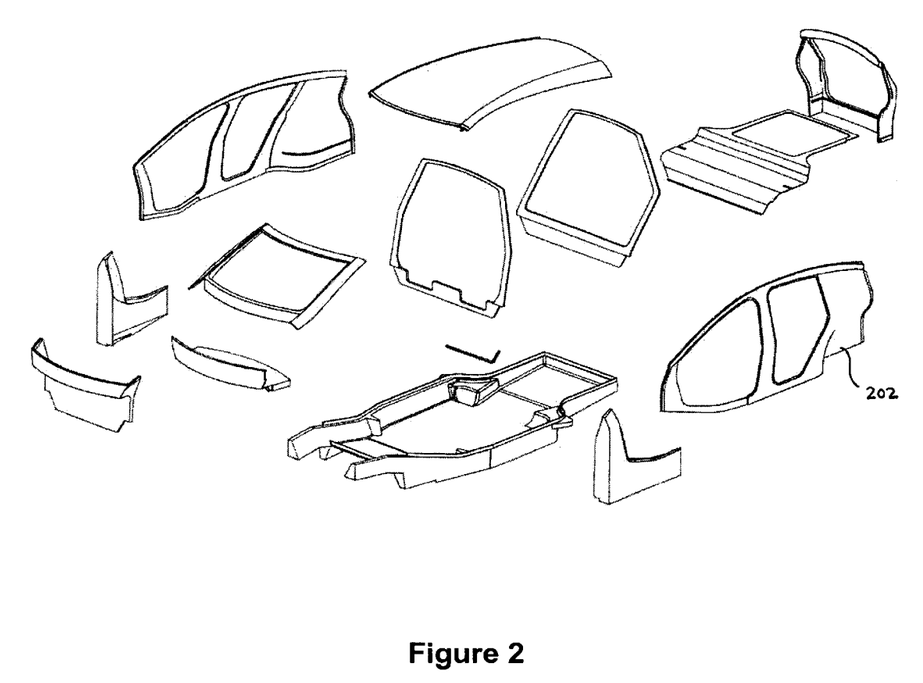
FIG. 2 is an exploded isometric view of parts of the structure made in accordance with the present invention.

As shown in FIG. 2, the body structure is preferably divided into a number of parts. The boundaries of these parts are preferably selected to facilitate manufacture. One way to facilitate manufacture of the parts is to create parts that can be referred to as being "globally planar," meaning that their overall shapes are as flat as possible. Complex overall geometries are achieved by combining more geometrically simple parts, as shown in FIG. 2. Such parts are more amenable to the process described herein because the blanks have to deform less to conform to the desired part shape. Globally planar parts also have simpler tooling.

All of the parts shown in FIG. 2 can be made according to the present invention. However, for purposes of clarity, this disclosure focuses on the manufacture of one part 202. Again, it should be kept in mind that every part shown in FIG. 2 and any other suitable part can be made in accordance with the present invention.

The process preferably begins by selecting the materials that are intended to be used in making the composite part. The starting materials include discontinuous aligned carbon fiber tow with a handling binder. This would typically be supplied in creels, or spools, for dispensing. Other fiber types (such as glass or aramid) and formats (such as continuous) could also be used. For the liquid infusion fabrication processes, the process that is the subject of this invention would utilize continuous tow reinforcement or discontinuous tow reinforcement, with a binder compatible with the intended matrix resin. For the solid state fabrication processes, the process that is the subject of this invention would utilize continuous tow reinforcement or discontinuous tow reinforcement pre-impregnated with the intended matrix resin, or pre-impregnated tape comprised of continuous or discontinuous tow reinforcement and the intended matrix resin. The choice of materials will be entirely interdependent with the design and complexity of the intended end component, with discontinuous tow reinforcement a requirement for even subtle geometries. The impregnation in either case could be in the form of hot melt, solvent, for thermoset or thermoplastic matrices, or commingling of for thermoplastic matrix resins.

For the reinforcement material form, options include discontinuous preimpregnated carbon tape; discontinuous preimpregnated carbon tow with thermoplastic; binderized discontinuous carbon fiber tow; binderized fabric strips comprised of discontinuous carbon fiber tow; and continuous carbon fiber tow.

For the matrix material, options include most thermoplastics and some thermosets that meet automotive requirements such as environmental stability (temperature, humidity, corrosives, etc.) cost, surface quality, toughness, and recyclability.

Figure 3:
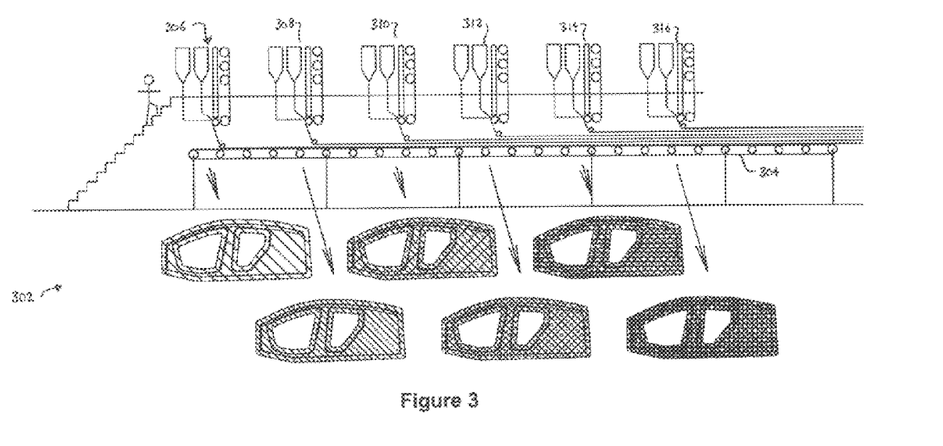
FIG. 3 is a schematic diagram of preferred embodiment of a material placement step in accordance with the present invention.
Figure 4:
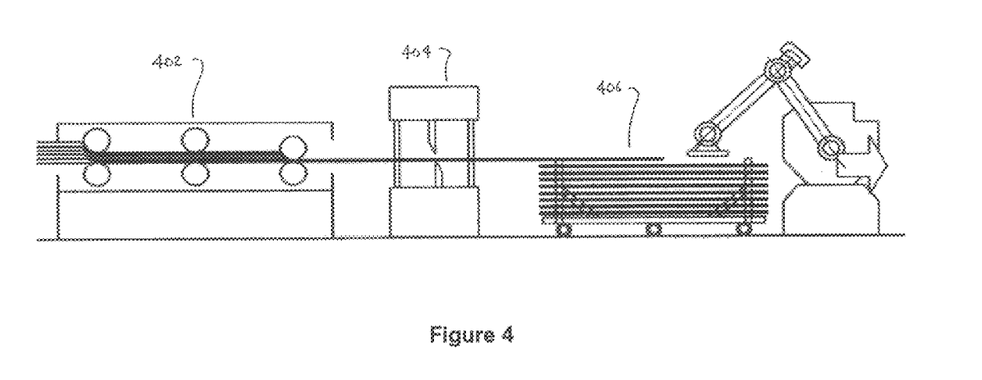
FIG. 4 is a schematic diagram of preferred embodiment of other steps in the process in accordance with the present invention.
Figure 5:
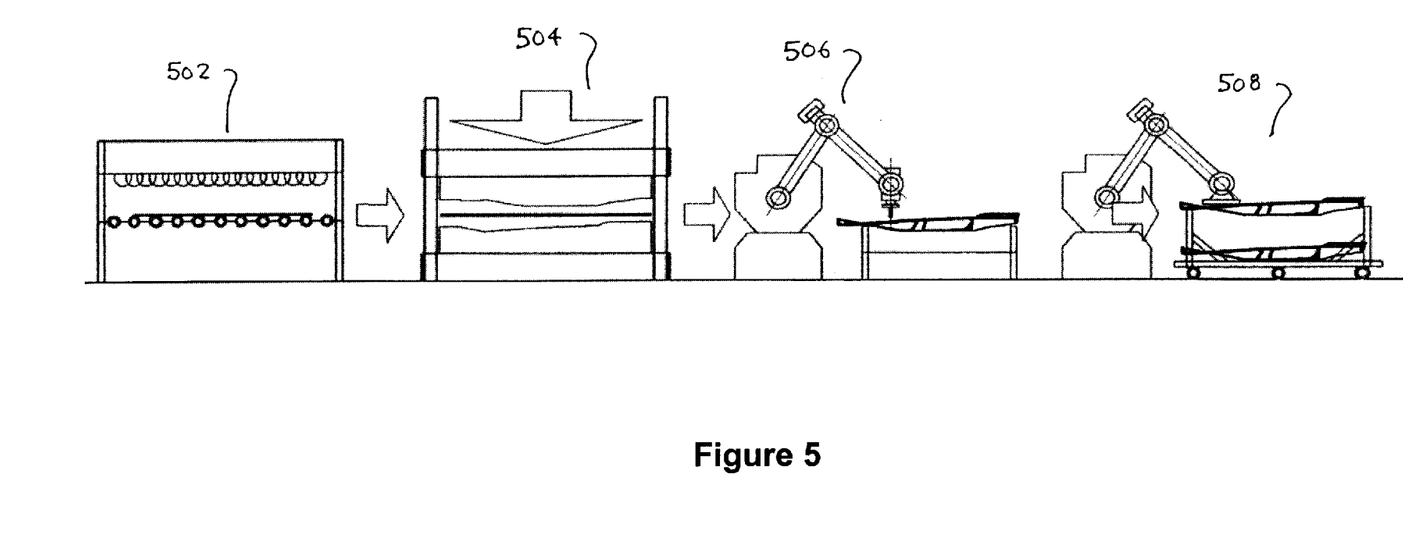
FIG. 5 is a schematic diagram of preferred embodiment of other steps in the process in accordance with the present invention.

After the starting materials, or stock materials have been selected, the materials are associated with one another and assembled in the manner shown schematically in FIGS. 3–5, which show the preferred steps used in a preferred embodiment of a process according to the present invention. The process is preferably capable of being fully automated, with programming tailored to the intended finished components and directly linked to three dimensional part design software and databases such as commonly used in the automotive and aerospace industries. The steps are described individually with parallel discussion of potential process variations illustrating the versatility of the invention in.

FIG. 3 shows an early step of the process, the material placement step 302 As shown in FIG. 3, the process preferably includes at least one material placement station 306, preferably more than one material placement station is used. In an exemplary embodiment of the present invention, six material placement stations 306, 308, 310, 312, 314, and 316 are used.

Figure 6:
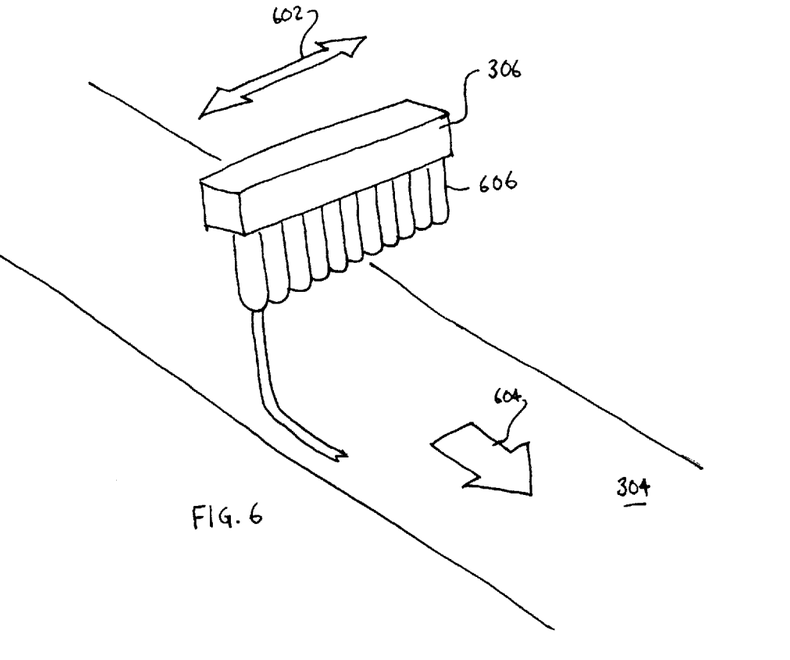
FIG. 6 is a schematic diagram of a preferred embodiment of a material placement station in accordance with the present invention.

Referring to FIG. 6, each material placement station can be moved in a direction 602 that is different than the direction of motion 604 of conveyor 304. For clarity, FIG. 6 shows only one placement station 306. It should be kept in mind that the other placement stations 308, 310, 312, 314, and 316 can also move in a manner similar to placement station 306. In an exemplary embodiment of present invention, the placement stations move in a direction 602 that is perpendicular to the motion 604 of conveyor 304.

Material placement station 306 preferably includes a plurality of heads 606. Preferably heads 606 are disposed in a direction similar to the direction of motion 602.

Figures 7, 8:
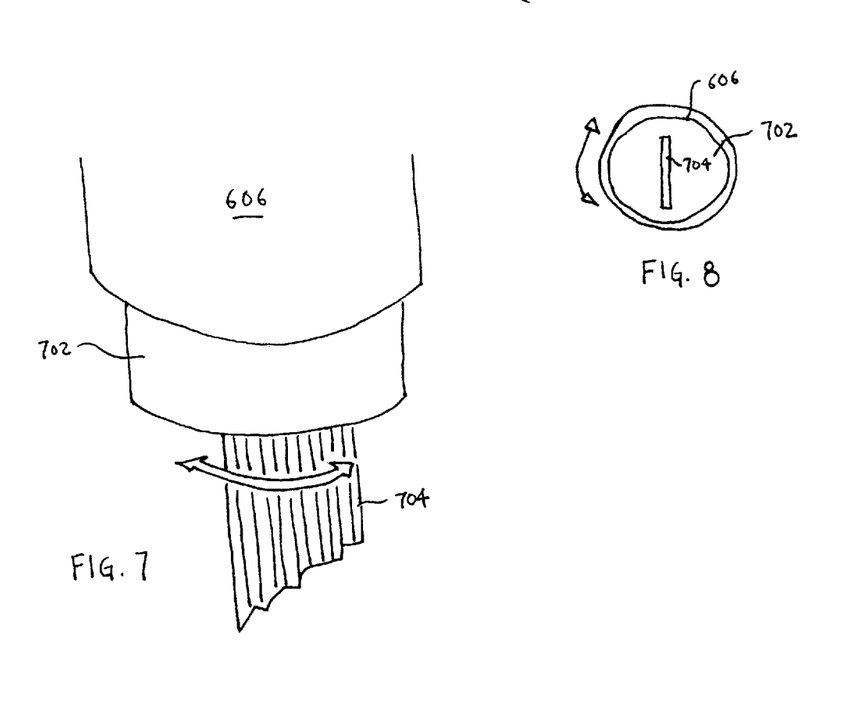
FIG. 7 is an enlarged isometric schematic view of a head in accordance with the present invention.
FIG. 8 is a bottom view of a preferred embodiment of a head in accordance with the present invention.

Referring to FIG. 7, each of the heads 606 includes a rotating portion 702. This permits head 606 to dispense a material 704 in a variety of directions relative to head 606. FIG. 8 shows a bottom view of head 606 and rotating portion 702. The relative orientation of material 704 can be seen with respect to rotating portion 702.

Given this arraingement, the material placement stations 306 are able to dispense a plurality of materials 704. This plurality of material assumes the configuration of a sheet when disposed by placement station 306. By selectively rotating heads 606 and moving placement station 306, the material can be dispensed in a variety of orientations and directions. The invention also contemplates that different placement stations, for example, station 306 and 308 (see FIG. 3) will dispense material in directions different than one another.

Heads 606 can also provide discontinuous material feed. In other words, the material dispensed by head 606 can be turned on or turned off when desired.

Returning to FIG. 3, as the different placement stations 306, 308, 310, 312, 314 and 316 dispense material, different plys having different orientations of fibers or material can be observed.

Once a component has been designed with this production process in mind, the laminate architecture and flat plane layout (developed blank) of the desired end component may be sent to a pre-processing software program. This program generates an NC machine program for the tailored blank machine that is part of the subject of this invention.

The result of the combination of the moving table and the series of heads (several may be required for each ply in the stack) is continuous production of laminated sheet with the specific lay-up programmed for that particular run of sheet that could be either 1) consolidated under a hot roller with carefully controlled pressure application and a series of rollers and heat zones to produce near fully consolidated laminated sheet for solid state stamping fabrication approaches, or 2) a dry binderized laminated sheet for liquid infusion fabrication processes. The capability of the placement heads could allow starting and stopping of the materials to allow for cutouts such as doors and windows, which will reduce materials scrap, which could be a significant source of cost. A potential variation of the tape laying head that may provide further cost benefits, is to use "chopper gun" to place highly aligned plies down on the moving table, with each gun laying up an individual angled ply as would the placement head. The gun could potentially lay down all the material forms discussed in the section of this document.

Several options and modifications can be made to the material placement step. At the ply level, placement options include: 1) placement head plays out the tape from a roll mounted to the head, heats it as it moves through the head, and further at the point of application via a heated placement roller, and places it in NC programmed locations on the moving belt; 2) placement head aligns numerous preimpregnated tows to create a "tape" just before point of application, and places it in NC programmed locations on the moving belt; 3) placement head impregnates numerous binderized tows, aligns them to create a tape just before the point of application, and places it in NC programmed locations on the moving belt; 4) placement head plays out the fabric strip from a roll, heats it in the head and further at the point of application via a heated placement roller, and places the material in NC programmed locations on the moving belt; 5) placement head aligns numerous binderized tows, heats them to create a binderized tape just before the point of application, and places it in NC programmed locations on the moving belt; and 6) placement head chops the carbon fiber tow on the fly, and places the discontinuous fibers on the moving table in an aligned fashion. In option 6), binder powders are distributed uniformly either on the fly or once the ply is completely laid down.

At the laminate level, multiple placement stations are required, each using an identical head technology. The number of stations required is determined by the desired production rate, the number of plies, angles, and special details, and the selected starting material form. Each head would place material per the NC program to lay down a single ply at a given angle. Once a given point on the belt has moved through all the activated placement stations, the result is a laminate of the desired combination of number of plies and respective angles, including pad-ups and other special reinforcements. Entire operation is NC controlled and capable of switching to a different vehicle variant as product pull system mandates.

The consoildation stage 402 comprises a series of heated consolidation rollers that compresses the laminate stack to a desired level of consolidation and thickness. A variation of this approach is to place binderized tows into a band of highly aligned dry fibers at the prescribed angle. Binderizing powders (a resin powder that is chemically compatible with the intended matrix resin) could be deposited between the plies as well if required. After the final ply is laid down, a thermal compaction step could be applied to hold the fibers in their proper position prior to subsequent processing steps. The resultant sheet could then be cut and kitted if it is destined for a liquid infusion fabrication process. If the material is to be used in a stamping operation, an additional step of liquid infusion and consolidation, much like a pultrusion or extrusion process, could be applied to fully impregnate and consolidate the laminate prior to cut and kit. This kit could then be used in a solid state stamping fabrication process. Consolidation, if required, would be performed at the end of the laminating operation using a series of heated and cooled rollers. This step would be tailored to the intended final fabrication process as discussed briefly in the previous paragraph.

Other options that are available at this step include:
1) The laminate stack is run through a series of heated rollers under increasing pressures to fully consolidate the laminate stack.
2) The laminate stack is run through a "stabilization" zone that includes a heated zone and mild compaction roller that simply applies a uniform through thickness temperature to knit all the plies together to enable subsequent handling of the kitted laminates. The stack must be stable enough to go through a dry forming operation (if required for more complex geometries) yet remain lofty enough to enable adequate resin flow in the subsequent liquid infusion processing step that produces the finished component.

The cut and kit stage 404 and 406 comprises an NC controlled ultrasonic cutting machine (or similar technology) that cuts each tailored blank from the moving belt and sends the blank to either a fabrication cell or into a staging area. This stage is similar to NC ultrasonic cutting stations widely used in the aerospace industry.

Regardless of the end use, liquid infusion molding, solid state stamping, or other, the laminated stack can be cut and kit into predefined bins for delivery to the final processing cell. Additional elements of the final component, such as adhesives sheets, colored decals, or fittings etc. could be added to the bins prior to deliver to the final processing cell.

Ink jet identification technology is entirely compatible with the processes described as part of the subject of this invention. They can be employed at any point along the length of tailored blank machine and at the cut and kit portion of the overall process to provide material and part ID, as well as fabrication instructions for the final production process used to make the final component.

The process can employ ultrasonic NC controlled cut and kit: each "tailored blank" is cut from the moving belt and kitted with the other laminates required for a complete body set, then sent to the fabrication cell to be turned into a final component. Other cutting technologies could be applied as well.

The component fabrication step (for the solid state fabrication process illustrated) includes a pre-processing and molding station. A pre-heat shuttle 502 would be utilized to heat the laminate stack to the desired temperature and then rapidly shuttle the stack between the tools in the stamping press. The second station is a single stage heated stamping die 504 will clamp the perimeter of the laminated sheet and stamp the component. After stamping, the stamping tool is rapidly cooled from 220° C. to below glass transition temperature, then demolded.

Starting with a bin of kitted flat tailored blanks, properly identified using ink-jet and/or bar code tracking technology, the final fabrication process imparts the shape and final curing and/or consolidation of the component. Fabrication cells are arranged as shown in. Each cell identifies the process steps required to proceed to the next cell in the sequence, along with key cell parameters that effect cost and timing. Fabrication steps comprise best industry practice for either solid state stamping or liquid infusion, with process parameters tailored to best exploit this invention.

Preprocessing options include: 1) a pre-heat shuttle would be utilized to heat the laminate stack to the desired temperature and then rapidly shuttle the stack between the stamping dies, and 2) a pre-forming operation that utilizes a simple heated forming tool similar to a press (but not nearly so accurate and with minimal applied pressure) that can form the binderized laminate into a near net shape, prior to the infusion operation. In addition, some components may require embedded hard points or other pre-placed details.

Processing options include solid state and liquid infusion methods. For solid state, a single stage heated stamping die will clamp the perimeter of the laminated sheet and stamp the component. For liquid influsion, the binderized laminate goes straight into the heated infusion tool, the tool is closed which forces the stack into the shape of the closed cavity, and the matrix resin injected.

For solidification/curing, the tools remain at temperature until the component is cured for thermosets. If thermoplastic, the tool is rapidly cooled to just below the Tg, then demolded.

The final step is a robotic trim station using conventional high speed routers with low horsepower. Drills would be high speed with a low feed to reduce back side breakout. Both drills and routers will be flooded with water for fiber control and cooling. Robotic pick and place technology 508 would be used in conjunction with vacuum jigs and fixtures to maintain rate and repeatability.

Final trim operations 506 involve high speed routing in vacuum chucked jigs as per best industry practice for high performance advanced composite structures. Robotic trim station using conventional high speed routers with low horsepower. Drills would be high speed with a low feed to reduce back side breakout. Both drills and routers will be flooded with water for fiber control and cooling.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for making a composite part comprising:

providing an array of heads arranged transverse to a machine direction;

reciprocatingly moving the array of heads transverse to the machine direction;

turning the heads on and off to intermittently dispense groups of fibers;

dispensing, on a conveyor moving in the machine direction, a first group of fibers at a first angle; and dispensing, on the conveyor, a second group of fibers at a second angle, wherein the first angle is different than the second angle.

2. The method according to claim 1, wherein the conveyor moves at a constant speed.

3. The method according to claim 1, wherein the first group of fibers is dispensed intermittently.

4. The method according to claim 1, wherein the second group of fibers is dispensed intermittently.

5. The method according to claim 1, wherein the first group of fibers is dispensed intermittently within the composite part.

6. The method according to claim 1, wherein the second group of fibers is dispensed intermittently within the composite part.

7. The method according to claim 1, wherein the first group of fibers is dispensed with a head that can move in a direction different than the machine direction.

8. The method according to claim 1, wherein the array of heads move perpendicularly to the machine direction.

9. The method according to claim 1, wherein the array of heads is arranged perpendicular to the machine direction.

10. The method according to claim 1, further comprising rotating heads of the array of heads.

11. The method according to claim 1, further comprising consolidating the first group of fibers and the second group of fibers using a heated roller.

12. The method according to claim 1, further comprising cutting the first group of fibers and the second group of fibers to form a blank.

13. The method according to claim 12, further comprising stamping the blank to form the composite part.

14. The method according to claim 12, further comprising fabricating the composite part from the blank using liquid infusion molding.

* * * * *